United States Patent
Ron et al.

(10) Patent No.: US 10,514,910 B2
(45) Date of Patent: Dec. 24, 2019

(54) AUTOMATICALLY MAPPING DATA WHILE DESIGNING PROCESS FLOWS

(71) Applicant: Oracle International Corporation, Redwood Shores, CA (US)

(72) Inventors: Juan Allo Ron, Foster City, CA (US); Nicolas Damonte, Redwood City, CA (US); Rodolfo José Cruz, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 75 days.

(21) Appl. No.: 15/589,929

(22) Filed: May 8, 2017

(65) Prior Publication Data

US 2018/0081994 A1 Mar. 22, 2018

Related U.S. Application Data

(60) Provisional application No. 62/395,913, filed on Sep. 16, 2016.

(51) Int. Cl.
*G06F 9/44* (2018.01)
*G06F 9/22* (2006.01)
*G06F 8/41* (2018.01)

(52) U.S. Cl.
CPC .............. *G06F 9/226* (2013.01); *G06F 8/433* (2013.01); *G06F 8/437* (2013.01); *G06F 9/22* (2013.01)

(58) Field of Classification Search
CPC . G06F 8/433; G06F 8/437; G06F 9/22; G06F 9/45; G06F 9/226
See application file for complete search history.

(56) References Cited

U.S. PATENT DOCUMENTS

| | | | |
|---|---|---|---|
| 2004/0078776 A1* | 4/2004 | Moon | G06Q 40/08 717/101 |
| 2015/0074642 A1* | 3/2015 | Weatherhead | G06F 8/24 717/121 |

(Continued)

OTHER PUBLICATIONS

Luigi Marini et al., Clowder: Open Source Data Management for Long Tail Data, ACM, 2018, retrieved online on Aug. 26, 2019, pp. 1-8. Retrieved from the Internet: <URL: http://delivery.acm.org/10.1145/3220000/3219159/a40-Marini.pdf?>. (Year: 2018).*

(Continued)

*Primary Examiner* — Hanh Thi-Minh Bui
(74) *Attorney, Agent, or Firm* — Trellis IP Law Group, PC (57) ABSTRACT

An example method facilitates associating data objects with elements of a process to be implemented via a process-based software application. The example method includes determining that a developer has added a particular software element to a software application being developed by the developer; accessing metadata describing the software element; and using the metadata to automatically associate the software element to one or more data objects to be used by the software element during running of the software application. A process cloud may facilitate implementing the method by automatically performing data mapping for software elements, such as approval tasks, forms, and so on, by determining appropriate task outcome data objects with reference to data characterizing a software flow of the software application, and by similarly automatically selecting and/or creating data objects for forms, which may be associated with or used by a task.

15 Claims, 7 Drawing Sheets

(56) References Cited

U.S. PATENT DOCUMENTS

2016/0202968 A1\* 7/2016 Ielceanu .................. G06F 8/31
717/120
2017/0052662 A1\* 2/2017 Smith, Jr. ............. G06F 3/0486

OTHER PUBLICATIONS

Yuangui Lei, An Instance Mapping Ontology for the Semantic Web, ACM, 2005, retrieved online on Aug. 26, 2019, pp. 67-74. Retrieved from the Internet: <URL: http://delivery.acm.org/10.1145/1090000/1088635/p67-lei.pdf?>. (Year: 2005).\*

\* cited by examiner

AUTOMATICALLY MAPPING DATA WHILE DESIGNING PROCESS FLOWS

CROSS REFERENCES TO RELATED APPLICATIONS

This application claims priority from U.S. Provisional Patent Application Ser. No. 62/395,913, entitled AUTOMATICALLY MAPPING DATA WHILE DESIGNING PROCESS FLOWS, filed on Sep. 16, 2016, which is hereby incorporated by reference as if set forth in full in this application for all purposes.

BACKGROUND

The present application relates to computing, and more specifically to software development tools and methods, including data mapping mechanisms used to map or associate processes or process elements or activities of a process-based software application to context, e.g., data received and/or output by the processes.

Mechanisms for developing process-based software applications that leverage or otherwise use content from various data objects, e.g., data objects comprising collaborative content, are employed in various demanding applications, including tools for developing cloud-based social network applications, collaborative webpage content development mechanisms (e.g., wikis), integrated development environments for developing team management software, business-related user tasks, and so on. Such applications often demand efficient mechanisms for quickly configuring software to ensure that accompanying modules and processes receive accurate and current data inputs and provide outputs that are readily usable by subsequent processing stages, and/or other software applications and modules or steps.

Conventionally, to specify input and output data mappings for a given process or process step (e.g., process activity), a developer may manually search for (or create) input data objects to select for a particular process, and then hand code or otherwise manually specify instructions for where and how the output should be contained and delivered.

However, such manual data-mapping and organization can require substantial time and expertise. Furthermore, such manual specification of data mappings and data object management can be particularly susceptible to human error and disorganization, which may result in a process receiving stale data and/or result in misplacement or misconfiguration of output data.

SUMMARY

An example method facilitates associating data objects with elements of a process to be implemented via a process-based software application under development. The example method includes detecting that a developer has added a particular software element (e.g., approval task, form, etc.) to a software application being developed by the developer; accessing metadata describing the software element; and using the metadata to automatically associate the software element with one or more data objects to be used by the software element during running of the software application.

In a more specific embodiment, the process element includes a task, such as a user task. The example method further includes automatically mapping an outcome of the user task, which may include an approval task, to an outcome data object. The outcome data object contains the most recent outcome data available from a process flow of the software application.

The process element may further include a form, e.g., to be used by a task. The example method further includes automatically associating data of one or more data objects with the form in accordance with metadata characterizing the form, thereby mapping the form to the one or more data objects.

When the developer specifies a user task that uses a form, the example method may further include automatically creating data mappings for that form for both for form input and form output. Form metadata may be referenced to determine if a data object of a particular type that is to be associated with the form has already been created, and if so, then associating a first instance of the data object of a particular type with the form, thereby mapping the data object of a particular type to the form; otherwise creating a new data object of the particular type, and then associating the new data object with the form, thereby mapping the new data object to the form.

Accordingly, data associations for both forms and tasks (e.g., approval tasks, submit tasks, etc.) may be performed automatically. When a developer employs a software application designer tool leveraging BPMN (Business Process Model and Notation) to drop a first user task (e.g., a submit task or an approval task) into a representation of a process flow, then a new data object may be automatically created as needed, and data association may be done automatically. The created data object may be reused across other user tasks and will account for the latest outcomes of the tasks.

Hence, developers can now directly use data of such a newly created data object, thereby obviating the need to manually define the data object and perform additional tedious manual data associations for each process element.

A further understanding of the nature and the advantages of particular embodiments disclosed herein may be realized by reference of the remaining portions of the specification and the attached drawings.

DETAILED DESCRIPTION OF EMBODIMENTS

Conventionally, software developers may subscribe to certain cloud services to facilitate development of software applications and storage of associated files. A cloud service that is configured for software application or process flow development is called a Process Cloud Service (PCS) herein.

A process cloud service may employ a networked database to store files and other objects used by a given software program being developed. Server-side development environments may be accessible to developers via a browser. The development environments may be backed by the PCS, such that developed software application files are stored in the PCS database.

However, conventionally, specialized PCS databases often lack certain features and functionality that may be particularly useful to developers and associated software applications and accompanying process flows.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

Certain embodiments discussed herein are particularly useful for development, deployment, and implementation of process-based software applications. A process-based software application may be any software application definable by one or more sequences of steps, also called process elements or software activities. The terms "process element," "flow element," "software element," and "software process element" may be employed interchangeably herein to refer to any step, e.g., event, activity, gateway, sub-process, and so on. A sequence of steps of a process-based software application may be called a process flow. Process flows are often modeled and illustrated via swim lanes in a User Interface (UI) display screen. Process-based applications are often implemented via composite applications that may leverage different web services for different process steps.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Systems integration may refer to the establishment of communications between systems, e.g., software systems. When software systems to be integrated include enterprise applications, the integration process may be called Enterprise Application Integration (EAI). When the software systems run on a cloud (e.g., a collection of one or more networked server systems), then integration of the software systems may be called Cloud Application Integration (CAI). Note that embodiments discussed herein are not necessarily limited to a particular type of computing environment or types of software systems being integrated.

For clarity, certain well-known components, such as hard drives, processors, operating systems, power supplies, routers, Internet Service Providers (ISPs), workflow orchestrators, process schedulers, Tenant Automation Systems (TASs), certain web services, virtual machines, middleware, enterprise databases, MetaData Services (MDS) modules, and so on, are not necessarily explicitly called out in the figures. However, those skilled in the art with access to the present teachings will know which components to implement and how to implement them to meet the needs of a given implementation.

Figure 1:
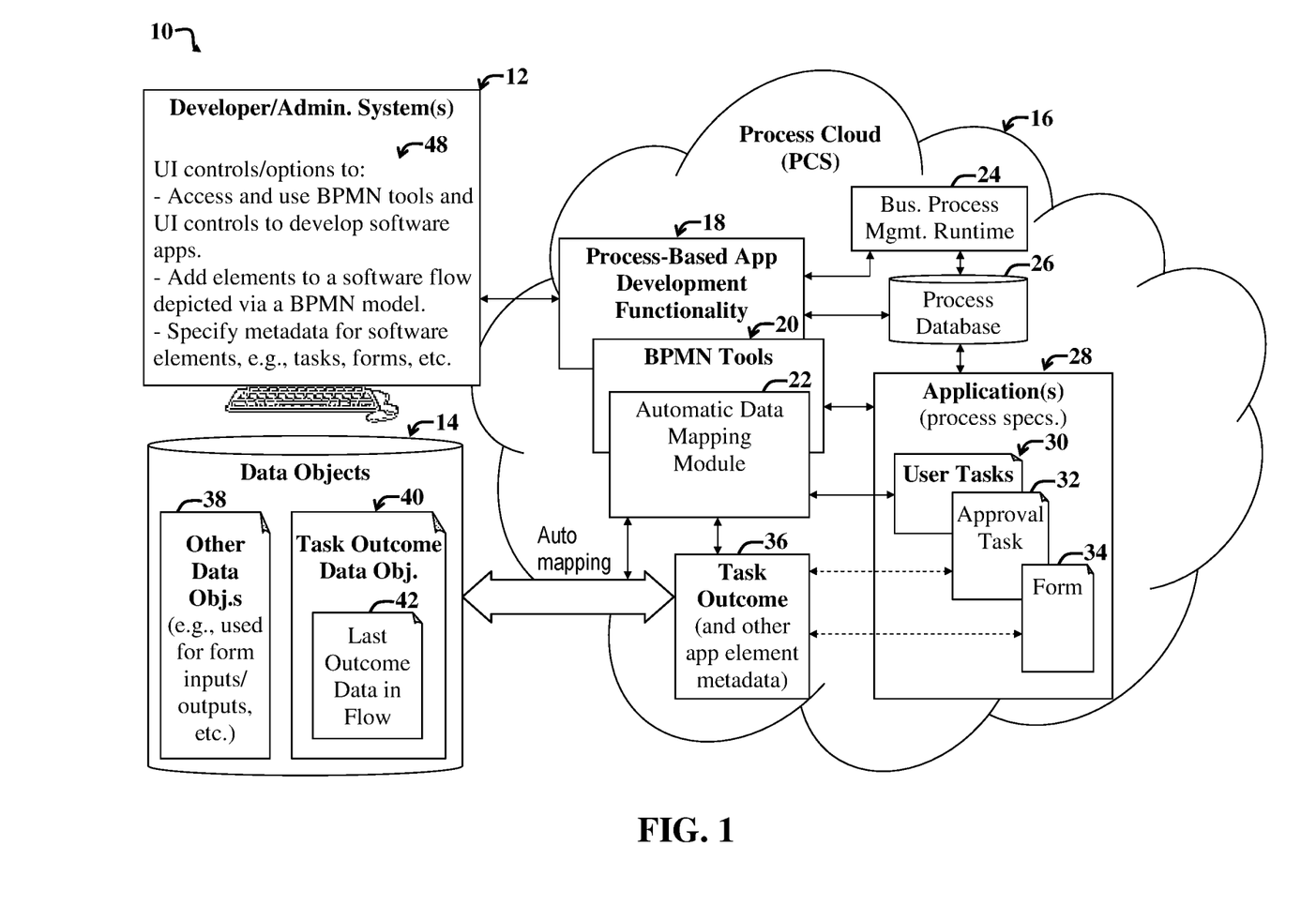
FIG. 1 is a first block diagram illustrating a first example system and accompanying computing environment enabling automatic mapping of data objects to software elements, e.g., tasks and forms, of a process-based software application being developed.

FIG. 1 is a first block diagram illustrating a first example system 10 and accompanying computing environment enabling automatic mapping of data objects to software elements, e.g., tasks and forms, of a process-based software application being developed.

For the purposes of the present discussion, an object, such as a data object, may be any grouping of or encapsulation of data and/or functionality. Examples of objects include classes or structures implemented via object-oriented programming languages; tables, rows, or records of a database; and so on. An object that contains primarily data, e.g., as opposed to functionality (e.g., method calls, etc.) is called a data object herein.

Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object include issuing a reminder for an appointment; issuing an approval for a loan application, and so on.

A business object may be any object used to organize information for business purposes. Data that is associated with a business object may be contained within a data structure or database associated with the object, or the information may be distributed among different applications, computers, and so on, without departing from the scope of the present teachings.

A representation of an object, i.e., a displayed object, may be displayed via graphical depiction, such as a node of a tree diagram, a menu item, dialog box, personnel icon, an entire user interface display screen, and so on. The graphical depiction of an object may also be called an object, a displayed object, or a node.

The overall system 10 may represent a networked computing environment, such as a networked enterprise computing environment. Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

The example system 10 includes developer computer systems 12 in communication with process-based application development functionality 18 of a process cloud 16. The process cloud functionality 18 includes a set of BPMN (Business Process Model and Notation) tools 20 for facilitating developing process-based software applications 28, e.g., composite applications involving sequences of steps or activities of a process implemented by and/or guided by the composite applications.

For the purposes of the present discussion, software functionality may be any function, capability, or feature, e.g., stored or arranged data, that is provided via computer code, i.e., software. Certain software functionality may be accessible via use of a user interface and accompanying user interface controls and features and underlying software applications. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, implementing an approval process based on a submitted form, and so on.

Various User Interface (UI) display screen controls 48 enabling developers (e.g., software designers) to use the BPMN tools 20 may be accessed via the developer computer systems 12, which may include a browser and/or other mechanism for communicating with the process cloud functionality 18. Examples of UI controls 48 that may be accessible via the developer computer systems 12 include UI controls for enabling access to and use of BPMN tools and associated functionality for developing software applications; for enabling developers to add elements to software flows depicted using a BPMN model; for specifying metadata for software elements, where the elements may include tasks, forms, and so on.

In the present example embodiment, the BPMN tools 20 include an automatic data mapping module 22 which may communicate with and/or monitor specifications of applications 28 under development. Note that while the application(s) 28 are shown separately from the process database 26 that the application(s) 28 may be maintained or stored in the process database 26. Furthermore, in other implementations, note that the process database 26 may be replaced with a database of a document cloud with which the process cloud 16 may be integrated.

A business process management runtime engine 24 includes computer code for facilitating deployment and running of the application(s) 28 when development is complete.

In the present example embodiment, an application 28 under development includes one or more user tasks 30 that include an approval task 32, which in turn includes or otherwise uses a form 34 as part of the approval task 32. The user tasks 30, 32 and form(s) 34 represent process elements, i.e., portions of a process and/or specification thereof. Note that the example system 10 supports automatic mapping for different types of user tasks 30. For example, both "submit" and "approval" user tasks can use the automatic mapping functionality 22 of the system 10. In general, automatic mapping may be performed for all human tasks and associated user tasks (i.e., any process element that uses human input to produce an output). Examples of user tasks include entering a form, specifying a value, indicating an approval or disapproval of an input form, etc. Note that submit tasks and approval tasks can both use a form, which may facilitate automatic data association. Such user tasks, e.g., an approval task, can have an outcome (e.g., as may be stored in a task outcome data object), such that automatic mapping occurs for the latest outcome data.

The user tasks 30 and accompanying form(s) 34 are characterized by metadata describing the tasks and/or forms. For example, metadata of an approval task may describe a task outcome 36. The automatic data mapping module 22 leverages the task outcome 36 information to automatically map the approval task 32 to a task outcome data object 40 of a set of accessible data objects 14. The most recent outcome data 42 identified in a particular software flow that uses the user tasks 30 will be associated with the approval task 32, such that the recent outcome data 42 is mapped to the approval task 32.

Similarly, metadata describing the form(s) 34 may be accessed by the automatic data mapping module 22, e.g., to determine input object type, output object type, etc. The form metadata 36 is then used by the automatic data mapping module 22 to automatically associate applicable data object(s) 38 with the form(s) 34, thereby automatically mapping form input and output data objects. In an embodiment, the mapping function can be achieved by any mechanism (e.g., metadata) that identifies a software component or process element (e.g., a form) and associates it with one or more data objects, such as an outcome data object that is generated as an output by a software component.

Note that conventionally, developing a process (e.g., process-based software application) with a conventional BPMN tool requires that the developer design the process flow, which may involve specifying how to implement the flow and associate and manipulate data associated with the flow. This may involve manually specifying data object management behaviors and manually specifying data mappings between software activities and the process context. Such steps often require substantial time and expertise. Such obstacles are alleviated via the present example embodiment.

In the present example embodiment, the process cloud 16 is enhanced with the automatic data mapping module 22 to facilitate automatic data mapping for user tasks.

When a developer includes an approval task (which has a task outcome) in a process flow of a process-based software application, the task outcome data is automatically mapped to an outcome data object 40, which will contain the last outcome data 42 (i.e., most recent) available in or specified via the process flow. Also, when the developer implements a user task with a form, e.g., the form 34, the automatic data mapping module 22 automatically performs the requisite data mapping for that form 34.

Figure 2:
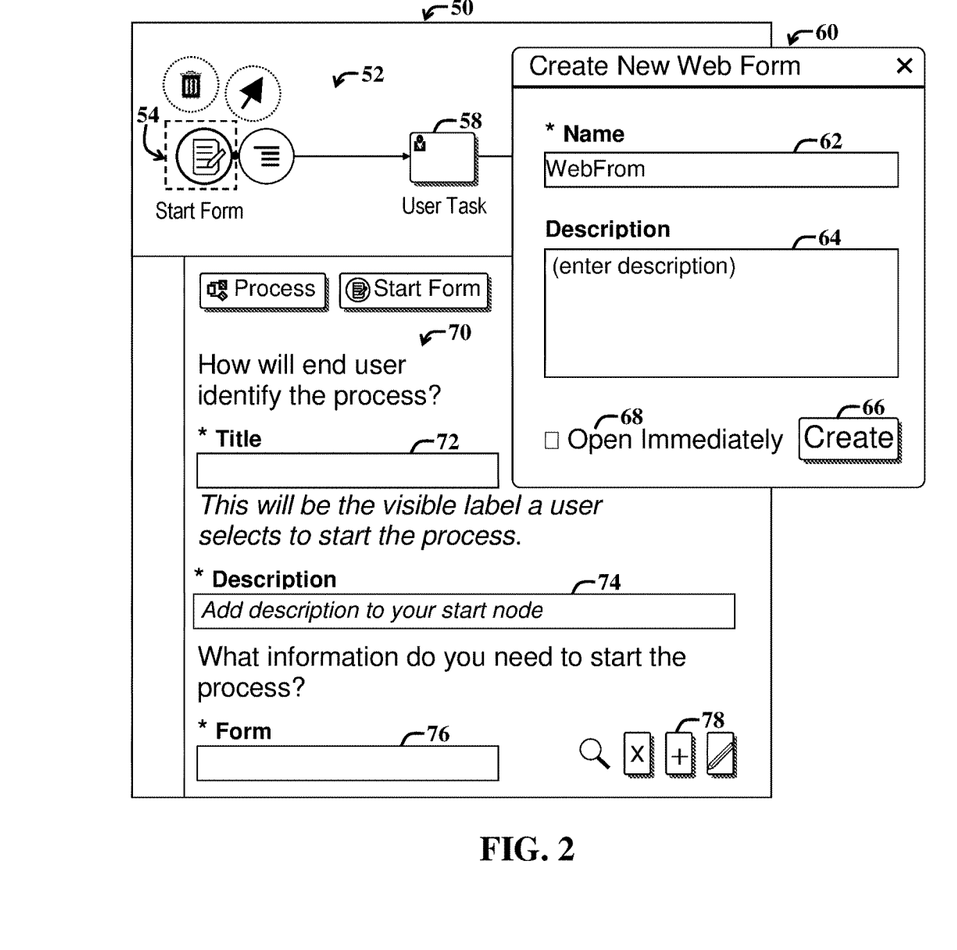
FIG. 2 shows a first example UI display screen that may be displayed using the developer system 12 of FIG. 1, and which illustrates UI controls and features for adding a form to a start event of a process represented by a process model, wherein the form will be input to a subsequent user task, e.g., process activity.

FIG. 2 shows a first example UI display screen 50 that may be displayed using the developer system 12 of FIG. 1, and which illustrates UI controls and features 60-68 for adding a form to a start event 54 of a process represented by a process model 52, wherein a form associated with the start event 54 will be input to a subsequent user task 58, e.g., process activity.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

The first example UI display screen 50 includes various UI controls and fields 70 for specifying a title 72 of the process, a description 74, and a particular form to use 76 as input to trigger starting of the process represented by the process model 52. In the present example embodiment, the user has chosen to create a new form, e.g., by selecting a plus button 78 adjacent to the form field 76, thereby triggering display of a create new web form dialog box 60. Note that in certain implementations, the create new web form dialog box 60 may automatically appear as needed, e.g., when no existing forms are available for use by the start form event 54, which has been selected (e.g., by clicking with a mouse).

The create new web form dialog box 60 includes a name field 62 for specifying a name of the new form. In the present example use case, the web form to be created is called WebForm. A description field 64 enables the user to provide a form description, which may be used as additional form metadata. An additional option 68 for opening the form immediately upon user selection of a create button 66 is also provided.

Note that when adding a new form for input to a user task, e.g., the user task 58, the associated data objects are automatically created, and the necessary data associations are made. In the present example use case shown in FIG. 2, the user employs the create new web form dialog box 60 to create a new form for the start element 54.

After creation of the new form (WebForm) for use as output from the start element 54, the user task 58 can then be configured to receive the WebForm as input, i.e., to add a form to the user task 58. This can be done by selecting the user task 58, thereby triggering display of one or more UI controls that may appear adjacent to the user task 58 for adding a form.

User selection of a UI control for adding a form to the user task 58 may trigger display of an additional dialog box with options for searching for a form to add. Furthermore, the additional dialog box will automatically include a listing of one or more existing forms that may be selected. In the present use case, an existing form (i.e., WebForm) that was created using the create new web form dialog box 60 will automatically be listed as an option to assign as an input to the user task 58.

Figure 3:
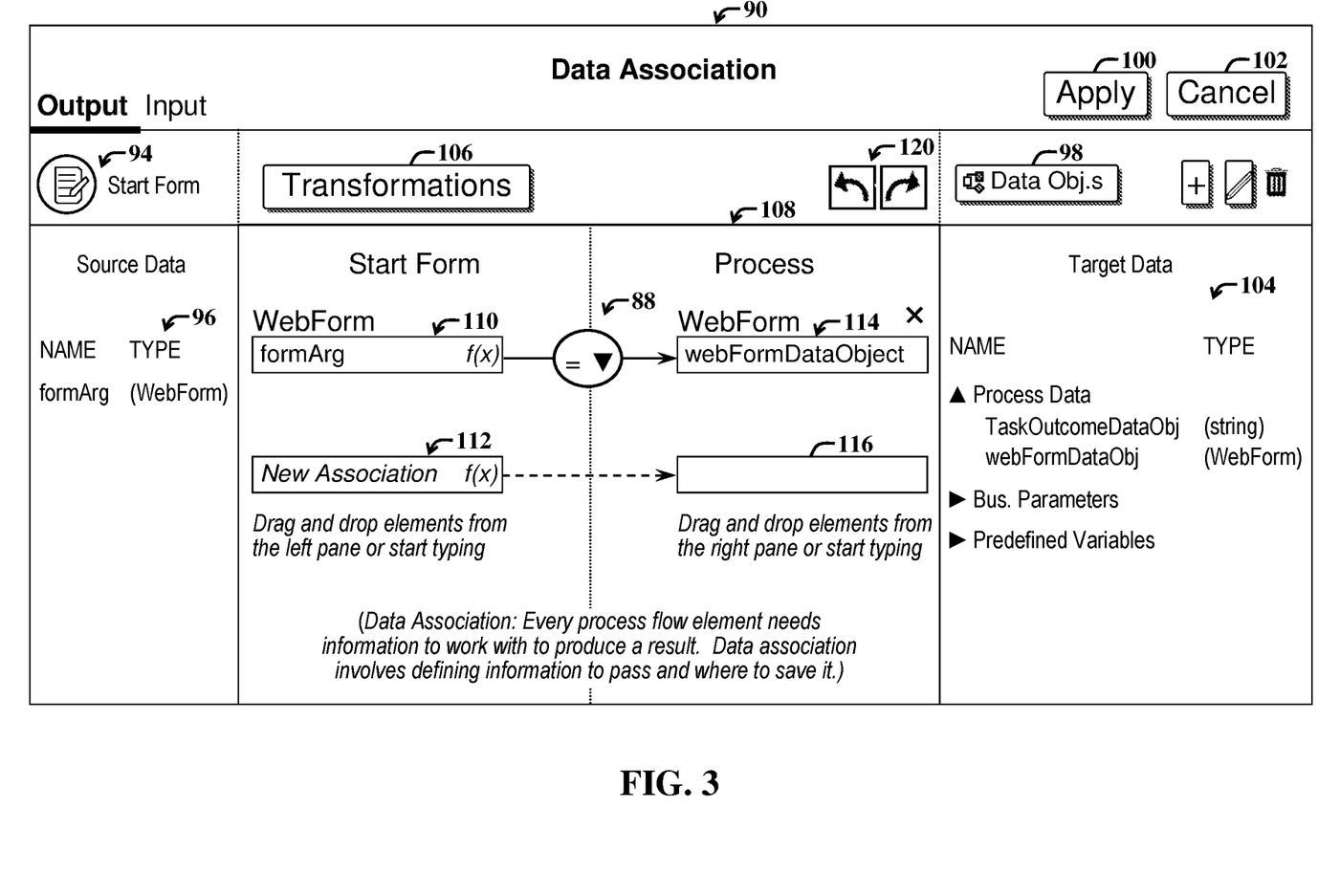
FIG. 3 shows a second example UI display screen for illustrating and enabling configuration of automatic data associations for an input transformation or mapping of data to be input to a process step, e.g., process activity.

FIG. 3 shows a second example UI display screen 90 for illustrating and enabling configuration of automatic data associations for an input transformation or mapping 88 of data to be input to a process step, such as a user task.

In the present example embodiment, a user (e.g., developer) has navigated the development environment of the process-based application development functionality 18 of FIG. 1 using the UI controls 48 available via a browser of the developer system 12, to thereby display the second example UI display screen 90. The second example UI display screen 90 illustrates results of adding a new form to a start event to create a start form 94.

The underlying automatic data mapping module 22 of FIG. 1 has automatically mapped the created WebForm to a process (called Process in FIG. 3), as indicated via a mapping 88 in a mappings section 108 that specifies that the WebForm and form arguments 110 are mapped to a web form data object, as specified in a corresponding field 114 on the right side of the mapping 88.

In general, items 94, 96, 110, 112 on the left hand side of the second UI display screen 90 characterize inputs to the process that is characterized by items 98, 104, 114, 116 on the right hand side of the second UI display screen 90. For example, form data (e.g., as may be input by a user using a form) of the start event 94 is assigned to a web form data object for use as a payload (i.e., collection of one or more input parameters) by a subsequent user task, as discussed more fully below.

The mappings section 108 includes an additional start form control 112 into which items 96 characterizing the start form 94 may be selectively dragged to further generate automatic mappings and/or to enable specification of manual mappings. For example, in another use case scenario, the start form 94 may have additional form arguments that can be dragged and dropped into the start form control 112. If automatic data mappings have already been calculated by the underlying software, then the corresponding process field 116 will be populated with the determined output object. Otherwise, the user may drag one or more items from the target data section 104 into the process control 116 to facilitate generating the mappings between source data 96 and target data 104.

The second example UI display screen 90 includes various additional optional controls, e.g., redo and undo buttons 120, a data-object selection button 98 (e.g., for searching for and/or otherwise selecting and/or configuring data objects to be used to store the start form 94, and so on). An apply button 100 and cancel button 102 provide additional options for applying the settings and mappings shown in FIG. 3, or cancelling implementation of the shown mappings 88 and/or modifications made thereto. A transformations button 106 may provide various user options for specifying any particular manipulations to or selections from the input form data 96 that should be made when mapping the form data 96 into a particular web form data object.

Note that proper data associations can be essential for efficiently and accurately moving information among steps (e.g., activities) of a process. When a user implements a user task using a form, data association is needed to populate and move the information on that form. In general, data association may involve a source and a target, where the source provides data and/or expressions to be assigned to (i.e., associated with or mapped to) the target. For example, a user task, such as an approval task, may require both input and output data associations. The input data associations or mappings specify data (e.g., mapping or assigning form data to a web form data object) to be input into the activity, i.e., into the user task. The output data associations specify an output data object for storage of output data from the activity.

When a user implements a user task with a form, the underlying system (e.g., the process-based application development functionality 18 and accompanying automatic data mapping module 22) will create the data mapping for that particular form automatically (both for input and output). If a data object of that type has already been created, then the created object will be used; otherwise a new data object will be created to accommodate the form data in accordance with a predetermined association and/or transformation.

In summary, data mapping is automatically done when a form is selected. If the data object already exists, that one will be used. If the data object with the same name does not exist, then the first data object of the same type will be used. If there is no data object of the same type, then a new data object will be created. If a new data object is created, it may adhere to the following name convention: <form-name-starting-in-lower-case>DataObject<n> (where n is a number added to avoid name collisions, if the name exists). Name restrictions for data objects and forms may be similar. After data mapping, the user may be notified with a message below a form input dialog box.

Figure 4:
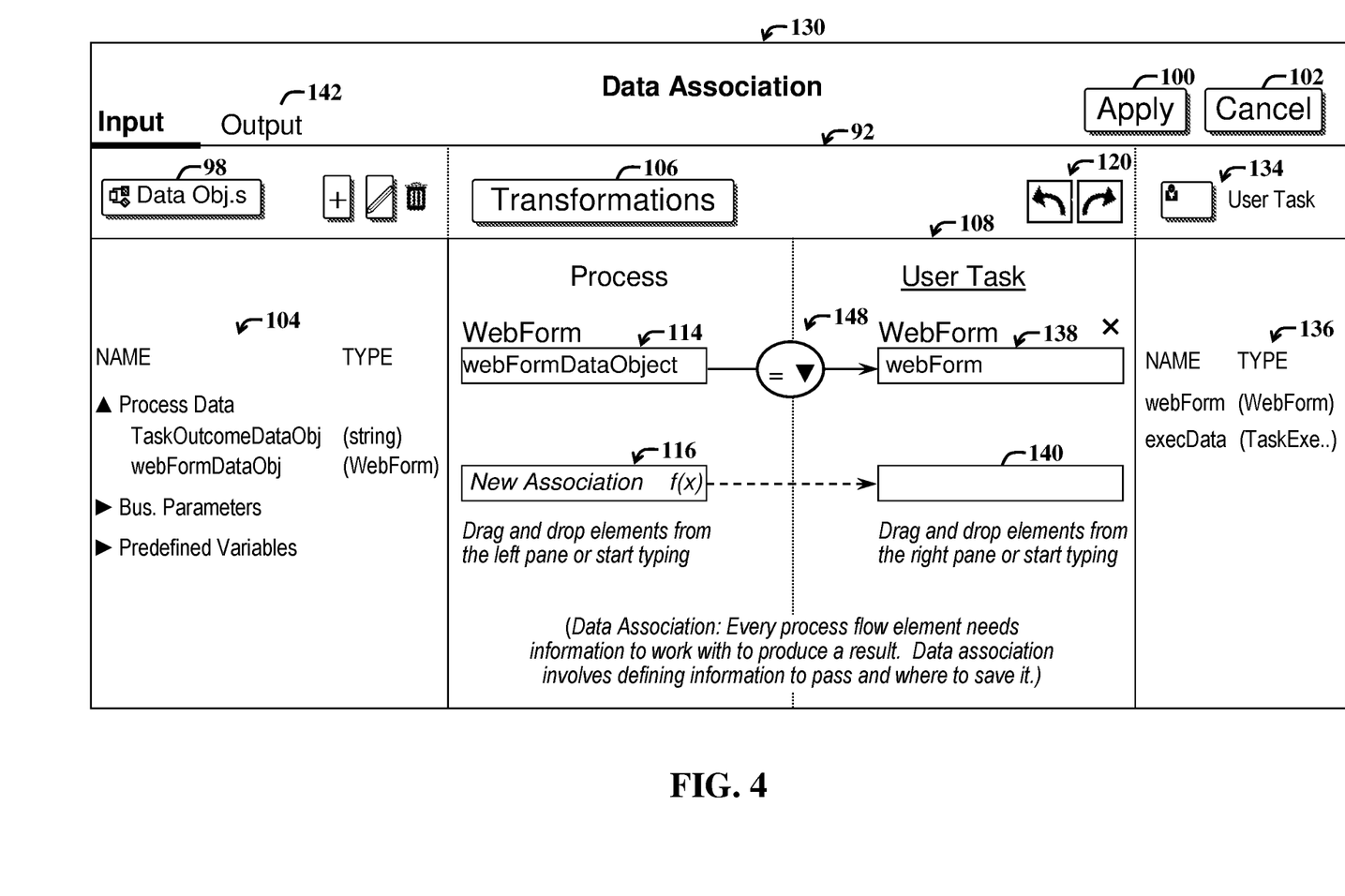
FIG. 4 shows a third example UI display screen for illustrating and enabling configuration of automatic data associations for an input data association or mapping of data to be input to a process step, e.g., process activity.

FIG. 4 shows a third example UI display screen 130 for illustrating and enabling configuration of automatic data associations for an input data association or mapping 148 of data to be input to a process step (e.g., a user task). Note that to display output associations for the user task, a user may select the user task pane (right hand portion of the mappings section 108), and then select an output tab 142, thereby causing display of UI display screen showing automatic associations (and associated options) that associate a webForm 138 with a web form data object to be output by the user task, and which may further specify (e.g., when the user task is an approval task), for example, a mapping between an outcome string produced by the user task (specifying approval or not) and a task outcome data object.

In the present example use case scenario, the third example UI display screen 130 may be illustrated after a user has configured the user task 58 of FIG. 2 to receive the form data from the start form event 54 of FIG. 2 as a web form data object. The data object used to store the form data (after the mapping illustrated in FIG. 3) will be used as input to a user task.

Accordingly, the right hand side of the second UI display screen 90 of FIG. 3, including the target data 104, now appears on the left hand side in FIG. 4, as the target data 104 will now represent input data to the user task 58 of FIG. 2. However, before the input (represented by the webFormDataObject 114) is used by the user task, an automatic mapping 148 assigns the input webFormDataObject 114 to the webForm 138, and the user task may then use the webForm 138.

Similarly, UI items 138, 140, 136 in FIG. 4 characterizing the user task 58 of FIG. 2 (also represented by the user task indicator 134 in FIG. 4) now appear on the right hand side (i.e., the output side) of the third UI display screen 130 of FIG. 4. Furthermore, the new automatic mapping 148 is generated to map the form data 114 to user task data 138, consistent with one or more available target data items 136. The generated mapping 148 is automatically generated (and may automatically account for one or more transformations that are represented by or viewable via selection of the transformations control 106 and that characterize the mapping 148).

Furthermore, additional user options 116, 140 enable users to provide or define an additional input to the next step in the process, e.g., user task. The new input 116 may include, for example, business parameters, predefined variables, etc., as may be selected from among the process items 104, which may represent process context that may be shared among process steps of a process.

Note that outcome data mapping may be performed similarly to automatic data mapping for forms, as a mapping for the outcome of a user task (e.g., approval task) is performed automatically. When a user drops the user task into a flow of a process model, then a new data object is created and associations are done automatically. That data object may be reused across all the user tasks and will maintain the latest approve task outcome. Accordingly, users can now directly use that data, without needing to manually define the data object and to further perform the data associations each for each new user task or other process element or activity.

Figure 5:
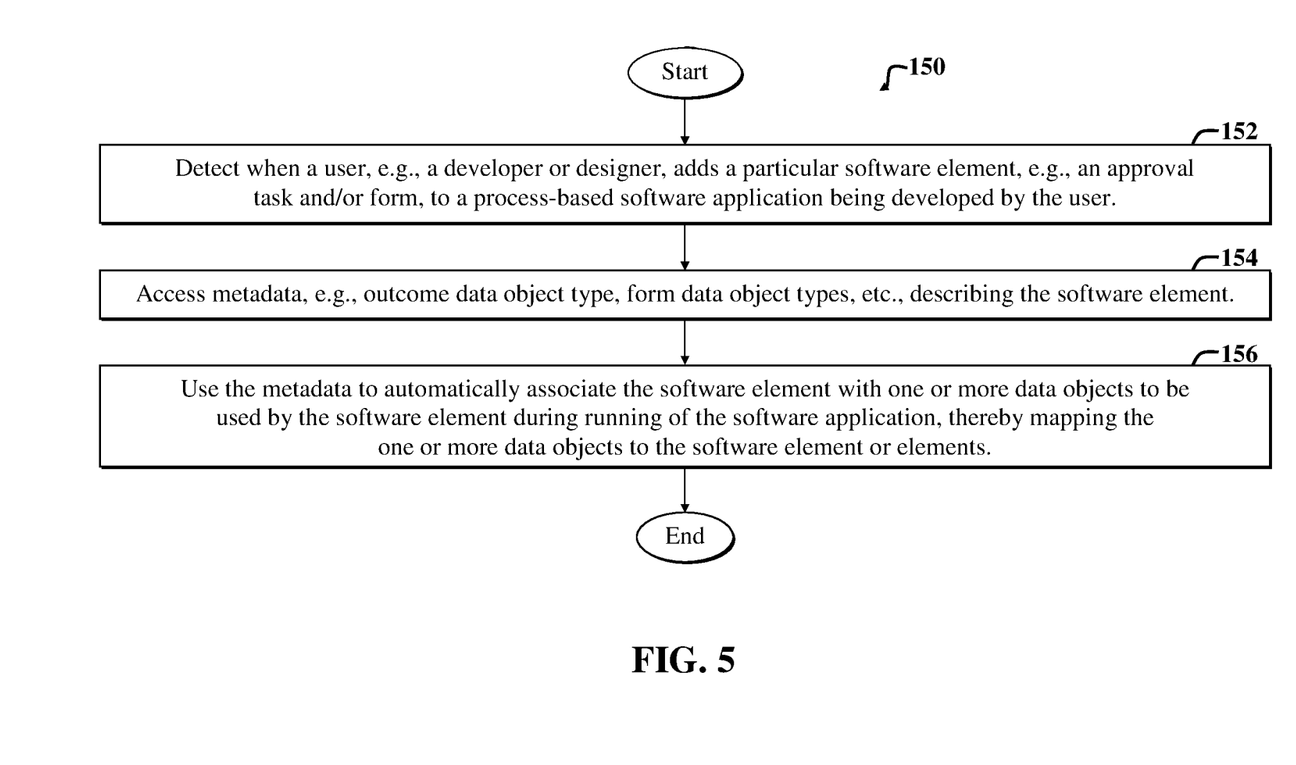
FIG. 5 is a flow diagram of an example method implementable via the embodiment of FIG. 1.

FIG. 5 is a flow diagram of an example method 150 implementable via the embodiment of FIG. 1. The example method 150 facilitates associating data objects with elements of a process to be implemented by a process-based software application.

The example method 150 includes a first step 152, which involves determining that a developer has added a particular process element to a software application being developed by the developer. The developer may employ a BPMN software tool (e.g., application designer development environment) to add a software element (also called a software process element, software element, or simply process element herein) to a process of the software application. For example, with reference to FIGS. 1-3, when the user adds (e.g., by dragging or dropping) a start form 54 or user task 58 into the process-based software application represented by the process model 52 of FIG. 2, the addition of the start form 54 or user task 58 is detected by the underlying software functionality 18 of FIG. 1.

A second step 154 includes accessing metadata describing the software element. The metadata may include, for example, information describing a task outcome and/or information describing object types for objects to be input to and output from a form, which may be part of a task, etc. For example, with reference to FIGS. 1-4, the accessed information (i.e., metadata) may identify the added event, for example, the start form 52 or user task 58 of FIG. 2, and may further specify, for the added event type, which types of data object(s) (e.g., formArg 110 and/or WebFormDataObject 114 of FIG. 3; webFormDataObject 114 and/or webForm 138 of FIG. 4) have been preassociated with the added event type.

A third step 156 includes using the metadata to automatically associate the software element with one or more data objects to be used by the software element when the software application is run. For example, with reference to FIGS. 1-5, examples of automatic associations are graphically depicted as the mapping 88 of FIG. 3, and the mapping 148 of FIG. 4.

Note that the method 150 may represent an algorithm that receives three inputs and provides one output. In particular, it may take the inputs (metadata, input software element(s), output data object(s)); then output an association between the data object(s) and software element(s). The mapping may be an association or link. The association may define information to pass and where and how to save it, i.e., in which data object.

Automatic mapping of the third step 156 may involve defining that an outcome of the software element is to be stored in a particular data object, and then performing any requisite format translations to ensure that the outcome data stored in the data object is of the appropriate format consistent with the semantics of the data object (e.g., JSON). Accordingly, the third step 156 may include associating input data objects and/or output data objects with a process flow step (i.e., software element—e.g., event, activity, or other element).

Note that the method 150 may be altered without departing from the scope of the present teachings. For example, the method 150 may further specify that the process element includes a task, such as user task, e.g., a submit task or an approval task. The example method 150 may further include automatically mapping an outcome of the approval task to an outcome data object, wherein the outcome data object contains the most recent outcome data available from a process flow of the software application.

The method 150 may further specify that the process element includes a form, e.g., as part of a task that uses the form. The method 150 may further include automatically associating data of one or more data objects with the form in accordance with metadata characterizing the form. Data maps for both form input and form output may be automatically created, e.g., by referencing form metadata to determine if a data object of a particular type of data object that is to be associated with the form has already been created, and if the data object of a particular type has been created, then: associating a first instance of the data object of a particular type with the form, thereby mapping the data object of a particular type to the form; or otherwise creating a new data object of the particular type; and then associating the new data object with the form, thereby mapping the new data object to the form.

Figure 6:
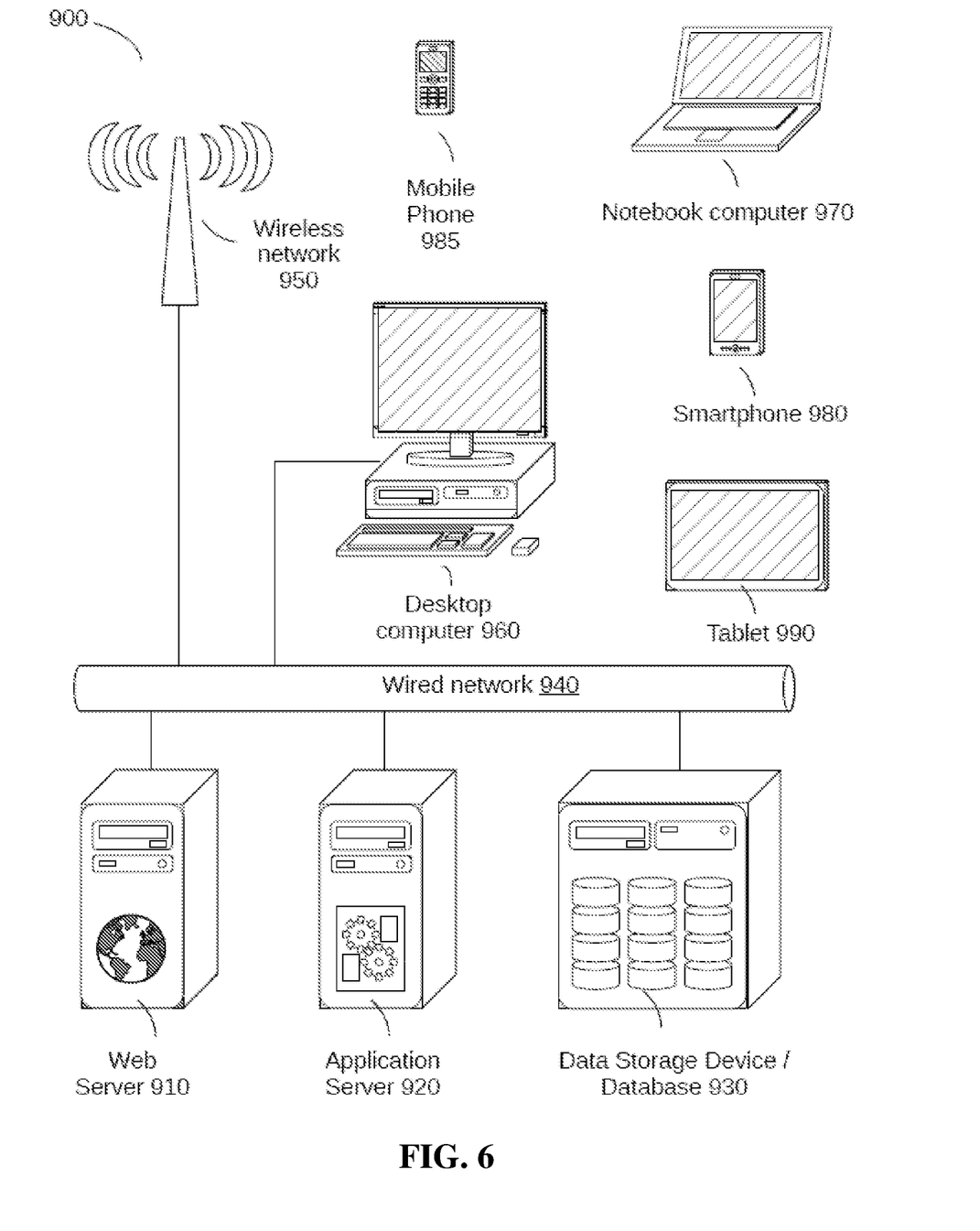
FIG. 6 is a general block diagram of a system and accompanying computing environment usable to implement the embodiments of FIGS. 1-5.

FIG. 6 is a general block diagram of a system 900 and accompanying computing environment usable to implement the embodiments of FIGS. 1-5. The example system 900 is capable of supporting or running various hardware and/or software modules and associated methods discussed with reference to FIGS. 1-5. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 6, the developer system(s) 12 of FIG. 1 may be implemented in whole or in part via one or more of the desktop computer 960, notebook computer 970, smartphone 980, mobile phone 985, tablet 990, of FIG. 6 and/or other computing devices.

In a particular example embodiment, the computing devices 960-990 run browsers, e.g., used to display the UI controls 48 of FIG. 1. Examples of UI display screens that may provide various UI controls and options, including the example UI controls 48 of the participant system(s) of FIG. 1, are shown in FIGS. 2-4.

In a particular example embodiment, browsers of the developer system(s) 12 of FIG. 1 connect to the Internet, represented by the wired network 940 and/or wireless network 950 as shown in FIG. 6, to thereby access one or more network-coupled servers, databases, and/or associated cloud-based functionality, as represented by the process cloud 18 of FIG. 1.

Examples of process cloud functionality that may be accessed an used by the developer system(s) 12 include process cloud services and accompanying process-based application development functionality 18, process-based software applications 28, and accompanying specifications for user tasks 30, approval tasks 32, and forms 34.

Note that one or more of the web server 910, application server 920, and data storage device or database 930 shown in FIG. 6 may be used to host software corresponding to the modules 18-36 of FIG. 1, as detailed more fully below.

In the particular example embodiment, process cloud functionality 18 and business process management runtime 24 run in a cloud computing environment that includes a collection of plural web servers 910, application servers 920, and data storage devices 930 shown in FIG. 6.

For example, in a particular example embodiment, process-based application development functionality 18 (e.g., a PCS composer) of FIG. 1 runs on a process cloud 16 that communicates with a document cloud via an integration mechanism, e.g., middleware, APIs, web services, etc. The document cloud may maintain data that may otherwise be maintained in the process database 26 of FIG. 1.

Note that the runtime 24 of FIG. 1, which supports running of the process-based software applications 28, may run on one or more application servers 920, as shown in FIG. 6, and may use and access data of the process database 26 and/or of a document cloud integrated with the process cloud 16. The process database 26 and folders and documents of a document cloud may be maintained via one or more of the data storage devices 930 of FIG. 6.

In general, software developers e.g., users of the developer system(s) 12 of FIG. 1, may subscribe to certain cloud services to facilitate development of and use of software applications and storage of associated files. A cloud service that is configured for software application or process flow development and/or implementation is called a PCS herein. A PCS may employ a networked database, e.g., the data storage device 930 of FIG. 6, to store files and other objects used by a given software program being developed.

In general, server-side development environments may be accessible to developers via browsers. The development environments may be backed by the PCS, such that certain developed software application files are stored in a PCS database (e.g., the PCS database 26 of FIG. 1) corresponding to the one or more of the data storage devices 930 of FIG. 6.

In the particular example embodiment, the UI display screens and associated controls 48 of the developer systems 12 of FIG. 1 include accompanying UI controls and associated options. Example options include options to browse, create, delete, define, upload, download, etc., folders, structures, and documents, etc., as maintained via the folder structures and documents.

Note that in the particular example embodiment, browsers used by the developer system(s) 12 of FIG. 1, interface with web servers 910 shown in FIG. 6 to access websites and accompanying webpage code, which is backed by applications used to implement the modules 18-28 of FIG. 1. The webpage code of the web servers 910 of FIG. 6 use web services, APIs, and/or other interfacing mechanisms to communicate with application software hosted on application servers 920 of FIG. 6 of the cloud, which includes a collection of web servers 910, application servers 920, and data storage devices 930 of FIG. 6.

Note that various embodiments discussed herein may provide substantial benefits in terms of providing efficiencies in systems and methods that achieve a new and useful end as it pertains to new software usability, collaboration functionality, and process metadata collection (e.g., metadata represented by conversations and accompanying messages associated with a process) and use. In particular, certain embodiments discussed herein uniquely leverage reuse of previously created and stored data objects and mappings, enabling users to quickly access and use the stored data objects and mapping functionality, thereby obviating manual creation of data objects and specifications of data mappings and transformations for different user tasks of a process flow implemented via a process-based software application.

Figure 7:
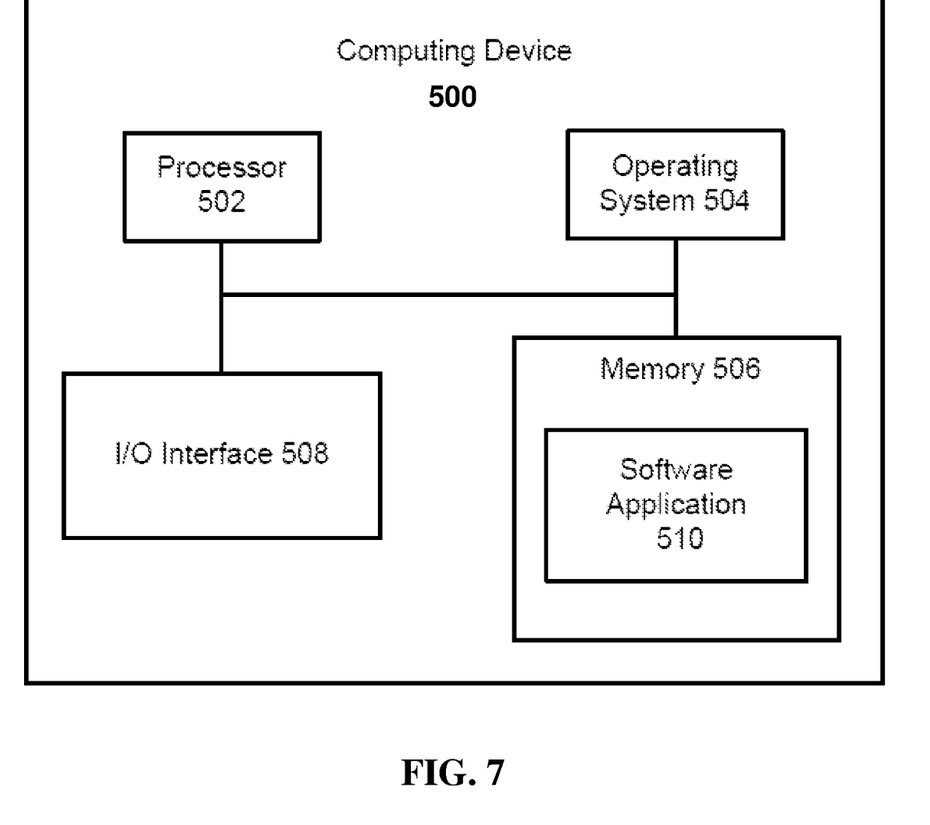
FIG. 7 is a general block diagram of a computing device usable to implement the embodiments of FIGS. 1-6.

FIG. 7 is a general block diagram of a computing device 500 usable to implement the embodiments described herein. While the computing device 500 of FIG. 7 may be described as performing one or more of the steps in the embodiments herein, in other embodiments any suitable component or combination of components of the computing device 500 or any suitable processor or processors associated with system 500 may facilitate performing the steps.

FIG. 7 illustrates a block diagram of an example computing system 500, which may be used for implementations described herein. For example, computing system 500 may be used to implement server devices 910, 920 of FIG. 6 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 7 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments discussed herein involve facilitating automatic data mapping for tasks, e.g., approval tasks and forms, embodiments are not limited thereto. For example, automatic data mapping as discussed herein may be readily adapted to work with input mechanisms other than forms, e.g., interactable visualizations, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including instructions executable by one or more processors for:
    determining that a developer has added a process element to a software application being developed by the developer, the process element including at least one of a form and a task;
    accessing metadata describing the process element;
    using the metadata to automatically associate the process element with one or more data objects to be used by the process element during running of the software application,
    referencing form metadata to determine if a data object of a particular type of data object that is to be associated with the form has already been created, and if the data object of a particular type has been created, then:
    associating a first instance of the data object of a particular type with the form, thereby mapping the data object of a particular type to the form, otherwise creating a new data object of the particular type, and
    associating the new data object with the form, thereby mapping the new data object to the form.

2. The non-transitory computer readable medium of claim 1, wherein the task includes an approval task.

3. The non-transitory computer readable medium of claim 2, further including:
    automatically mapping an outcome of the approval task to an outcome data object.

4. The non-transitory computer readable medium of claim 3, wherein the outcome data object contains most recent outcome data available from a process flow of the software application.

5. The non-transitory computer readable medium of claim 1, wherein the task uses the form.

6. The non-transitory computer readable medium of claim 5, further including:
    automatically associating data of one or more data objects with the form in accordance with metadata characterizing the form.

7. The non-transitory computer readable medium of claim 1, wherein, when the developer specifies a user task that uses a form, then:
    automatically creating a data mapping for that form automatically for both for form input and form output.

8. A method for facilitating associating data objects with elements of a process to be implemented via a process-based software application, the method comprising:
    determining that a developer has added a particular process element, including at least one of a form and a task, to a software application being developed by the developer;
    accessing metadata describing the process element;
    using the metadata to automatically associate the process element with one or more data objects to be used by the process element during running of the software application;
    referencing form metadata to determine if a data object of a particular type of data object that is to be associated with the form has already been created, and if the data object of particular type has been created, then:
    associating a first instance of the data object of a particular type with the form, thereby mapping the data object of a particular type to the form, otherwise creating a new data object of the particular type; and
    associating the new data object with the form, thereby mapping the new data object to the form.

9. The method of claim 8, wherein the task includes an approval task.

10. The method of claim 9, further including automatically mapping an outcome of the approval task to an outcome data object.

11. The method of claim 10, wherein the outcome data object contains most recent outcome data available from a process flow of the software application.

12. The method of claim 8, wherein the task uses the form.

13. The method of claim 12, further including automatically associating data of one or more data objects with the form in accordance with metadata characterizing the form.

14. The method of claim 8, wherein the developer specifies a user task that uses the form, then:
    automatically creating a data mapping for that form automatically for both form input and form output.

15. An apparatus for facilitating associating data objects with elements of a process to be implemented via a process-based software application, the apparatus comprising:
    one or more processors;
    a tangible processor-readable storage device including instructions for:

determining that a developer has added a particular process element, including at least one of a form and a task, to a software application being developed by the developer;

accessing metadata describing the process element;

using the metadata to automatically associate the process element with one or more data objects to be used by the process element during running of the software application, referencing form metadata to determine if a data object of a particular type of data that is to be associated with the form has already been created, and if the data object of a particular type has been created, then:

associating a first instance of the data object of a particular type with the form, thereby mapping the data object of a particular type to the form, otherwise creating a new data object of the particular type, and associating the new data object with the form, thereby mapping the new data object to the form.

* * * * *